Oct. 25, 1932.                H. VANDERBEEK                1,884,925
                                ROLLER BEARING
                             Filed July 8, 1931          2 Sheets-Sheet 2
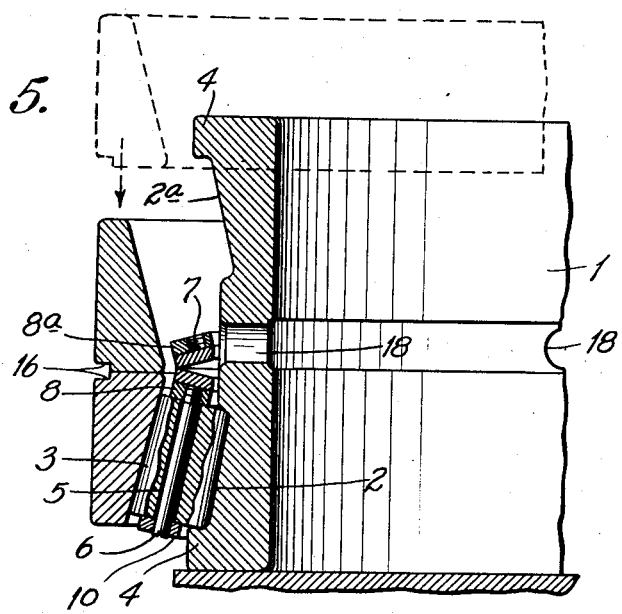
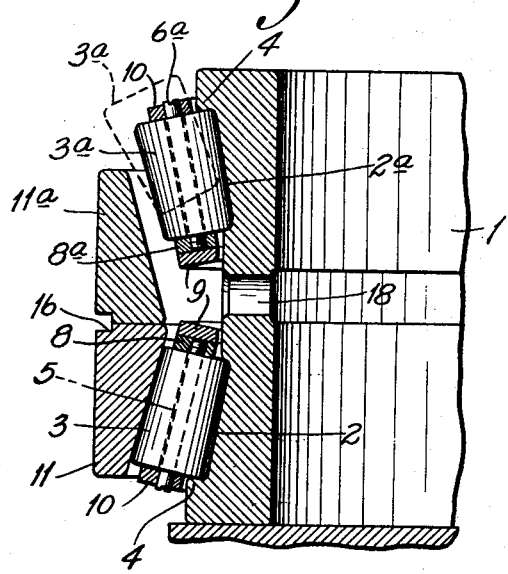
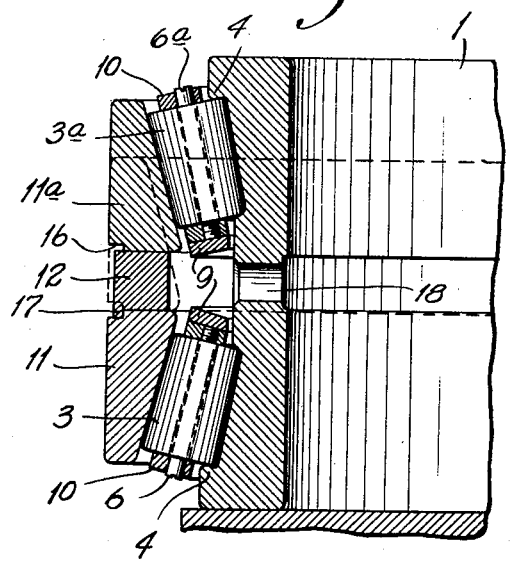
INVENTOR:
Hubert Vanderbeek,
by Constant Gravely
HIS ATTORNEYS.

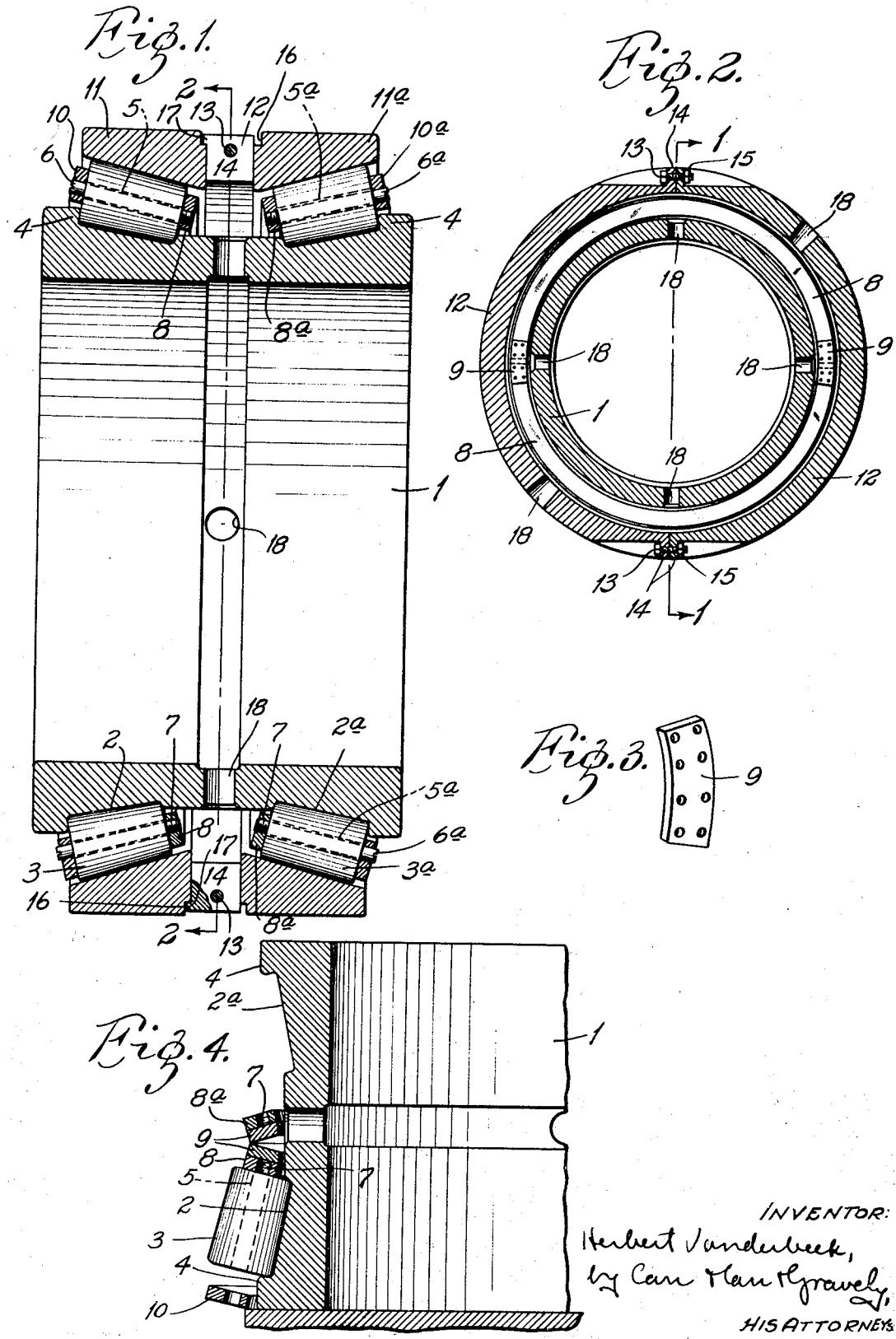

Patented Oct. 25, 1932

1,884,925

UNITED STATES PATENT OFFICE

HERBERT VANDERBEEK, OF CANTON, OHIO, ASSIGNOR TO THE TIMKEN ROLLER BEARING COMPANY, OF CANTON, OHIO, A CORPORATION OF OHIO

ROLLER BEARING

Application filed July 8, 1931. Serial No. 549,349.

My invention relates to roller bearings, particularly large taper roller bearings of the kind used in very large mills. The invention has for its principal objects a bearing that will withstand the heavy loads imposed thereon and that can be assembled and installed with facility. The invention consists in the roller bearing and in the parts and combinations and arrangements of parts hereinafter described and claimed.

In the accompanying drawings,

Fig. 1 is a longitudinal sectional view of a roller bearing embodying my invention, the location of the section being indicated by the line 1—1 in Fig. 2.

Fig. 2 is a cross-sectional view on a smaller scale, being taken on the line 2—2 in Fig. 1.

Fig. 3 is a detail view of one of the plates that secures portions of the small cage rings together; and Figs. 4 to 7 inclusive are partial sectional views similar to Fig. 1 showing successive stages in the process of assembling the bearing.

The drawings illustrate a large taper roller bearing suitable for use in large mills. The cone 1 or inner bearing member is of integral construction and its two conical raceways 2, 2a taper toward the middle of the cone. Running on said raceways are conical rollers 3, 3a. Thrust ribs 4 are provided at the outer ends of the cone 1 to guide the conical rollers 3, 3a on said raceways and to take up end thrust therefrom. The rollers 3, 3a have axial bores 5, 5a and cage pins 6, 6a, extend through said bores. The ends of said pins 6, 6a at the small ends of the rollers 3, 3a project therefrom and are threaded to fit threaded holes 7 in half ring cage members 8, 8a. Said half rings 8, 8a, are secured together at their meeting edges by arcuate plates 9 riveted to the ends of said rings. At the large ends of the rollers 3, 3a said pins 6, 6a extend into integral cage rings 10, 10a, the heads of said pins 6, 6a being secured to said large cage rings 10, 10a as by riveting their heads thereto.

Separate cups or outer bearing members 11, 11a are provided for the two series of rollers 3, 3a, said cups being spaced apart by half ring members 12 whose meeting edges are secured together by bolts 13 extending through lugs 14 that are preferably formed by recessing the outer surfaces of said half rings 12 near their ends. The bolts 13 are secured by nuts 15. To prevent radial movement of the assembled spacer members 12, the inner edges 16 of said cups 11, 11a are rabbeted and said spacer members 12 are provided along one edge with an annular flange 17 fitting in one of said rabbeted portions 16.

To permit lubrication of the bearing, the spacer members 12 and the middle of the cone 1 are provided with radial lubricant passageways 18.

As will appear from Figs. 4 to 7 inclusive, the bearing is assembled by being built up roller by roller on the cone. The inner or small cage ring members 8, 8a are first assembled at the middle of the cone and secured together by means of the arcuate plates 9. Then, as shown in Fig. 4, a roller 3 is brought into position against the first small cage ring member 8, the outer or large cage ring 10 is brought into position and a pin 6 is inserted through an opening in said large cage ring 10 and the bore 5 of said roller and screwed into an opening 7 of the small cage ring 8. Successive rollers 3 are then positioned and secured to said cage members 8 and 10. When the first complete series of rollers has been assembled, the pins 6 of its cage are secured to the large cage ring 10 as by riveting.

The bearing cups 11, 11a are then placed over the cone 1, as shown in Fig. 5, the first cup 11 being moved into position against its rollers 3 and the second cup 11a abutting against said first cup 11. The small cage ring members 8a are then properly positioned with reference to the second raceway and the second roller and cage assembly built up as previously described. The rollers 3a are brought into position by a tilting movement as indicated by the dotted lines in Fig. 6. After the second roller and cage assembly has been completed, the second cup 11a is moved away from the first cup (such position being shown by the dotted lines in Fig. 7 as well as by Fig. 6) into its proper position against the rollers 3a. Spacer members 12 are then selected having the proper width to position the bearing cups 11, 11a the correct distance apart and said spacer members are then secured together between the cups to make the completed bearing.

My bearing is a new and meritorious design of the pin type cage for perforated conical rollers. It is a very rugged construction and capable of withstanding heavy loads and high rotational speeds. The bearing may be lubricated either from the outside or from the inside. The above described process of assembling the bearing has the important advantage of facilitating the assemblying process and making the cost of assembling quite economical in comparison with other processes.

What I claim is:

1. A roller bearing comprising an integral bearing cone having two inwardly tapering raceway portions, axially bored conical rollers on each of said raceways, integral cage rings at the large ends of said rollers, cage pins secured thereto and extending through said roller bores, half rings secured together at the small ends of said rollers and receiving said pins, separate cups for said rollers and a spacer member between said cups.

2. A roller bearing comprising an integral bearing cone having two inwardly tapering raceway portions, axially bored conical rollers on each of said raceways, integral cage rings at the large ends of said rollers, cage pins secured thereto and extending through said roller bores, half rings secured together at the small ends of said rollers and receiving said pins, separate cups for said rollers and a spacer member between said cups, said spacer member comprising half rings secured together.

3. A roller bearing comprising an integral bearing cone having two inwardly tapering raceway portions, axially bored conical rollers on each of said raceways, integral cage rings at the large ends of said rollers, cage pins secured thereto and extending through said roller bores, half rings secured together at the small ends of said rollers and receiving said pins, separate cups for said rollers and a spacer member between said cups, said spacer member comprising half rings secured together and said ring members having an annular flange overlapping a portion of one of said cups.

Signed at Canton, Ohio, this 30th day of June, 1931.

HERBERT VANDERBEEK.